United States Patent [19]

Hartwig

[11] Patent Number: 5,615,839

[45] Date of Patent: *Apr. 1, 1997

[54] MIXER

[75] Inventor: Gert Hartwig, Wetaskiwin, Canada

[73] Assignee: Alteen Distributors, Ltd., Wetaskiwin, Canada

[*] Notice: The term of this patent shall not extend beyond the expiration date of Pat. No. 5,456,416.

[21] Appl. No.: 514,066

[22] Filed: Aug. 11, 1995

Related U.S. Application Data

[63] Continuation-in-part of Ser. No. 274,467, Jul. 13, 1994, Pat. No. 5,456,416.

[51] Int. Cl.$^6$ ..................................................... B02C 18/08
[52] U.S. Cl. ........................................ 241/260.1; 241/605
[58] Field of Search ............................. 241/101.76, 186.4, 241/260.1, 605

[56] References Cited

U.S. PATENT DOCUMENTS

| | | | |
|---|---|---|---|
| 3,156,451 | 11/1964 | Waas | 259/107 |
| 4,003,502 | 1/1977 | Barcell | 222/168 |
| 4,607,802 | 8/1986 | Lamort | 241/260.1 X |
| 4,938,426 | 7/1990 | Koenig | 241/222 |
| 5,020,918 | 6/1991 | Faccia | 366/279 |
| 5,082,188 | 1/1992 | Urich | 241/56 |
| 5,175,917 | 1/1993 | Faccia | 29/267 |
| 5,240,321 | 8/1993 | Miller | 366/45 |
| 5,379,951 | 1/1995 | Hughes | 241/60 |
| 5,429,436 | 7/1995 | Stone | 366/141 |
| 5,456,416 | 10/1995 | Hartwig | 241/260.1 |

*Primary Examiner*—John M. Husar
*Attorney, Agent, or Firm*—Emrich & Dithmar

[57] ABSTRACT

A mixer is comprised of a substantially circular container tub and includes an auger flighting member extending upwardly within the mixer for engagement with bales of material to cut and shred the bales. The auger flighting member includes a plurality of knife blades mounted on the outer radial edges of the auger flighting member. The upper end portion of the auger flighting member includes a mounted knife blade, with the upper end portion of the member being bent out of the plane of the auger flighting at an angle of between 15 and 25 degrees. The auger flighting member includes a lower flighting portion having an extension member comprised of a leading edge member cooperating with the floor of the tub with the extension member having a radial width at least equal to the radial width of the remainder of the lower flighting portion. A kicker plate is mounted adjacent the leading edge portion of the extension member to direct the cut material into the auger flighting member to facilitate feeding and mixing.

19 Claims, 2 Drawing Sheets

MIXER

BACKGROUND OF THE INVENTION

The present invention is a continuation-in-part application of my application Ser. No. 08/274,467 filed Jul. 13, 1994, now U.S. Pat. No. 5,456,416 which application is assigned to the assignee of the present invention.

The present invention relates to a mixer and, particularly, to a novel screw or auger flighting structure positioned to rotate within a container tub, an angled cutting knife mounted on the top end portion of the flighting structure, a deflector plate mounted on the lower end portion of the flighting structure, and a novel container tub all which facilitate the cutting, the feeding, and the mixing of the hay bales or other fibrous material in the mixer.

Mixers utilizing a single conical processing screw or auger flighting rotating within a container tub are known in the art. Such auger flightings generally may include cutting knives mounted radially outwardly from the flighting with the upper last turn of the auger flighting portion containing a plurality of knives extending perpendicularly upwardly from the plane of the flighting. The purpose of the perpendicularly extending knives is to cut the raw material bales into smaller pieces or chunks to facilitate mixing of the material by the lower auger flighting portion. However, the perpendicular upward extending knives or blades oftentimes engage the bales of material or the fibrous material and bounces the bales or the material out the container tub thereby interrupting the mixing operation.

Furthermore, when such prior art mixers are used to process fibrous materials having a high moisture content, such as wet silage or wet hay, the wet material tends to compact against the wall of the container tub away from the rotating auger flighting thereby ultimately clogging and stalling the mixer.

Additionally, prior art mixers generally include a lower screw or auger flighting portion of the screw or auger flighting member that substantially cooperates and sweeps about the mixer floor of the container tub to prevent the cut material from reaching the mixer floor. Accordingly, such mixers do not provide optimum cutting or mixing action.

SUMMARY OF THE INVENTION

One object of the present invention is to provide a mixer having a cutting blade mounted to the upper end portion of the screw or auger flighting.

It is another object of the present invention to provide a novel kicker plate mounted on the lower end portion of the lower screw or auger flighting portion to facilitate mixing within the mixer.

It is a further object of the present invention to provide a mixer including a novel auger flighting structure having a lower flighting portion having an extension portion which includes a leading cutting edge substantially extending to the periphery of the floor of the mixer container tub and a trailing edge portion mounted with respect to the leading cutting edge, which structure permits the fibrous material to readily reach or fall to the floor of the mixer to facilitate the cutting and mixing action of the mixer.

It is yet another object of the present invention to mount a cutting blade or knife at an angle to the plane of the end portion of the upper flighting portion to facilitate cutting and shredding of the material deposited into the container tub of the mixer.

Still another object of the present invention is to provide a mixer having a novel auger flighting structure wherein the radial width of an extension member portion of the lower auger flighting portion substantially extends to the periphery of the mixer floor, with the remaining portion of the lower auger extension member flighting member having a radial width substantially less than the radial width of the extension member, which structure permits the cut material to reach the mixer floor to facilitate the mixing within the mixer and reduce the power consumption necessary for driving the mixer.

It is yet a further object of the present invention to provide a novel screw or auger flighting structure comprised of a lower auger flighting portion, a central flighting portion and an upper flighting portion wherein the radial width of the central and upper flighting portions are tapered to form a cone-like cylindrical configuration.

In accordance with the present invention there is provided a mixer which is comprised of a substantially circular container tub having a first end, a second end and sidewalls which extend between the first and second ends. The auger mixer contains at least one screw or auger flighting portion rotating within the container tub and extending upwardly from the mixer floor of the tub. The top of the container tub is open to permit bales of material or other fibrous material to be positioned onto the rotating auger flighting to permit the auger flighting to cut the bales into smaller cut pieces to facilitate mixing. The auger flighting portion includes a lower flighting portion, an intermediate or central flighting portion and an upper flighting portion. Preferably, the radial width or radius of the lower flighting portion is greater than the central flighting portion, which in turn has a radial width greater than the upper flighting portion to provide a tapered cylindrical configuration. The lower flighting portion includes an extension member having a leading cutting edge substantially extending to the periphery of the floor of the mixer. The radial width of the extension member substantially perpendicular to the leading cutting edge is substantially less than the radial width of the leading cutting edge. The radial width of the lower flighting portion is greater than the radial width of the central flighting portion, which in turn has a radial width greater than the radial width of the upper flighting portion. This structure permits a large area of the mixer floor to be exposed to receive the contents of the mixer after each revolution of the auger flighting portion to provide better cutting action and mixing, to facilitate the fibrous material in reaching the floor where optimum cutting action occurs, to provide less overspill when fully loaded, and to provide reduced power requirements of the mixer. An outlet is positioned adjacent one lower end of the container tub to permit removal of the processed and mixed material from the mixer.

In one embodiment of the present invention, a plurality of knife members are replaceably secured to the lower flighting portion, the intermediate or central flighting portion and to the upper flighting portion. The knife members extend radially outwardly from the flighting portions. Preferably, the upper flighting portion includes a knife or blade member mounted to the upper trailing end portion. This blade member extends radially outwardly therefrom with the upper trailing end portion of the auger flighting being bent upwardly from the plane of the flighting between 15 to 25 degrees. Such a structure permits the rapid cutting and tearing apart of the bales of material or fibrous material deposited into the tub to be readily cut into small pieces or clumps. When the angle of the cutting blade, mounted on the trailing end portion of the upper flighting portion, is greater than approximately 25 degrees, the knife blade does not radially cut the bales of fibrous materials into chunks but instead the knife blade engages the fibrous material and oftentimes throws the material out of the container tub of the mixer assembly.

In a preferred embodiment of the present invention, the auger flighting structure is structurally arranged within the mixer container tub such that the lower flighting portion includes an extension member having a leading cutting edge extending substantially to the periphery of the floor of the mixer container tub. The lower flighting portion is spirally wound around an auger cylinder and possesses a radius less than the radial width of the extension member until the lower flighting portion is substantially radially above the leading cutting edge. The continuous spirally wound intermediate or central flighting portion possesses a radius less than the lower flighting portion until the central flighting portion is also substantially radially above the leading cutting edge of the lower flighting portion. Finally, the spiral wound upper flighting member has a radius less than the radius of the central flighting structure, which terminates after approximately one turn of the upper flighting member. Such a flighting structure permits the cut material to reach the bottom of the container tub floor and permits the attached knife blades to properly cut the material. Such a structure permits also a larger area of the floor of the container tub to be exposed thereby more readily receiving the cut and mixed contents of the mixer to provide a mixer that possesses better cutting and mixing with less overspill when fully loaded.

Additionally, it is preferred that the leading edge of the lower large radial width flighting portion includes a kicker plate mounted at an angle adjacent to the leading edge to feed and direct the material into the auger flighting to facilitate mixing.

Other and further significant objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the present invention providing the same or identical or equivalent principles may be used and structural changes which may be made as desired by those skilled in the art without parting from the scope of the present invention.

DESCRIPTION OF THE DRAWINGS

For facilitating and understanding the present invention, there is illustrated in the accompanying drawings a preferred embodiment thereof, from an inspection of which, when considered in connection with the following description, the invention, its constructions and operation and many of its advantages will be readily understood and appreciated.

DETAILED DESCRIPTION OF THE PREFERRED EMBODIMENTS

Figure 1:
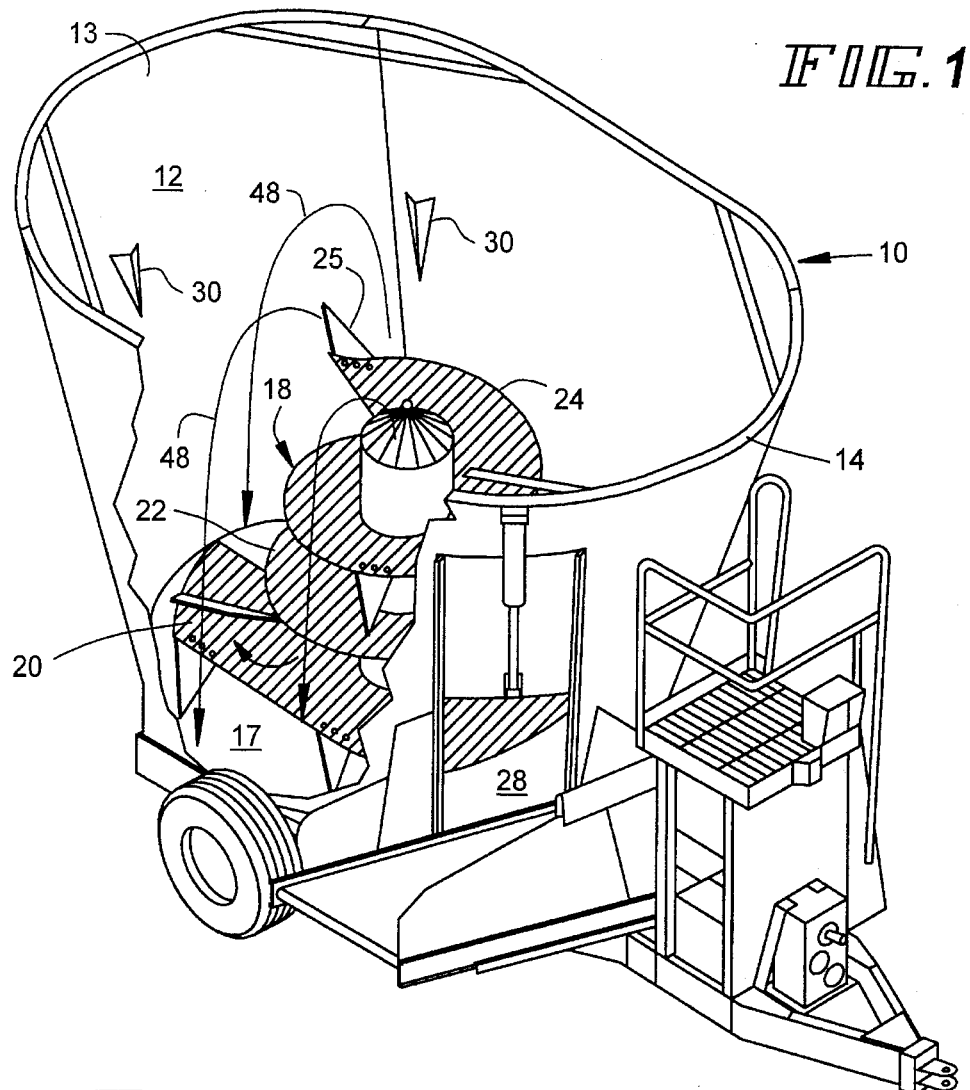
FIG. 1 is a perspective view of a mixer in accordance with the present invention.
Figure 2:
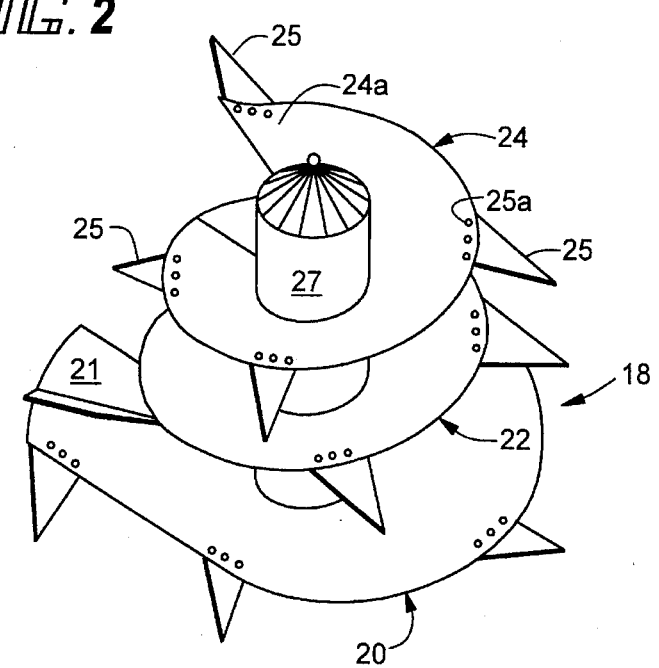
FIG. 2 is a perspective view of the auger flighting portion in accordance with the present invention.
Figure 3:
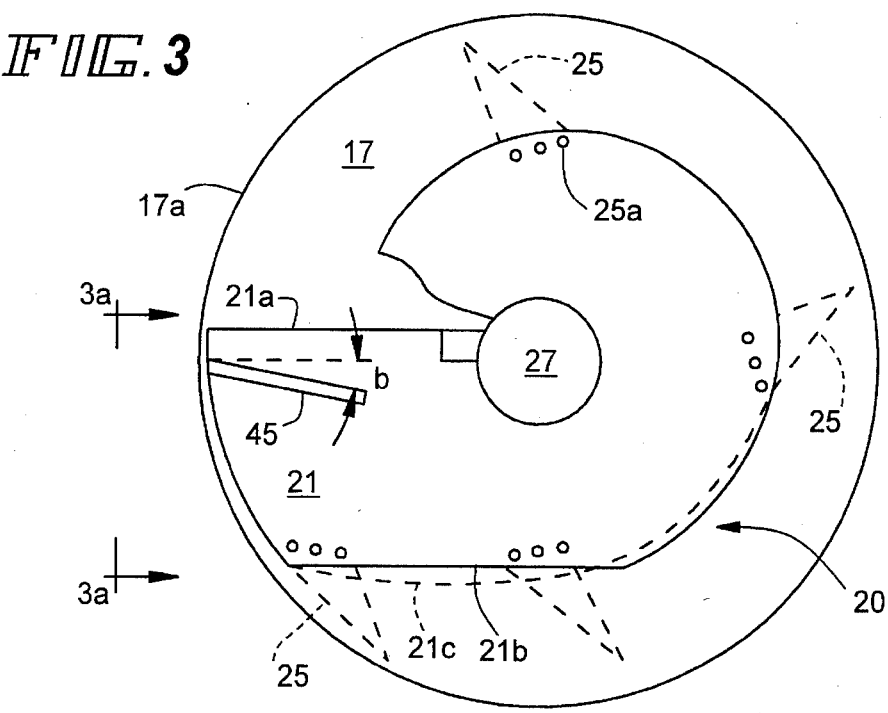
FIG. 3 is a sectional top view of the lower auger flighting portion with respect to the floor of the mixer illustrating the leading cutting edge and the trailing cutting edge and the spiral winding of the lower auger flighting, the mounting of a kicker plate adjacent to the leading edge of the lower flighting portion and the mounting of four knife members to the lower flighting portion in accordance with a preferred embodiment of the present invention.

Referring now to the drawings wherein like numerals have been used throughout the several views to designate the same or similar parts, in FIG. 1, a mixer 10 is illustrated which is comprised of a substantially circular container tub 12 having a first end 13, a second end 14 and sidewalls 15 and 16 which extend between the first and second ends. Preferably, the mixer 10 contains at least one screw or auger flighting portion 18 centrally positioned within the tub 12 and extending upwardly from the bottom or floor 17 within the interior of the tub. As shown in FIG. 2, the auger flighting portion 18 in accordance with the present invention includes a lower flighting portion 20, an intermediate or central flighting portion 22, and an upper flighting portion 24 which are spirally wound around an auger cylinder and continuous with one another. The upper flighting portion 24 has a radial width which is less than the radial width of the central portion 22, which in turn has a radial width less than the radial width of the lower flighting portion 20 to substantially provide a tapered cylindrical configuration. The term "radial width" is used to describe the radius of the auger flighting extending outwardly from the central auger cylinder 27. The lower flighting portion 20 includes an extension member 21 which extends outwardly substantially to the peripheral edge 17a of the floor 17 of the mixer 10. The extension member 21 includes a leading edge 21a and a trailing edge 21b. As shown in the drawings, the radial width of the extension member 21 is, preferably, sized from the leading edge 21a until it intersects the trailing edge 21b. The trailing edge 21b extends to a radial extended from the tangent of the central and upper flighting portions radii. This intersection occurs approximately one-half to three-quarters of the way around the lower flighting portion from the leading cutting edge 21a to provide a cut-off portion of the lower flighting portion. However, although FIGS. 2 and 3 depict the trailing edge 21b being substantially parallel to the leading edge 21a, it is within the scope of the present invention that the trailing edge 21b may be curved inwardly from the outer peripheral edge of the lower flighting portion 20 of a decreasing radial width, as shown by dotted line 21c in FIG. 3. Such structures of the lower flighting portion 20 permits a large area of the floor of the mixer to be exposed to receive the contents of the mixer after each revolution of the auger flighting portion to provide better chopping and mixing, to provide less overspill when fully loaded, and to provide reduced power requirements of the mixer, as shown by the arrows 48 in FIG. 1. Also, the extended portion of the lower flighting portion 20 enables the lower floor of the mixer to be sweeped to assure that all the cut fibrous material is recirculated and to assure complete clean out when unloading. The cut-off portion of the lower flighting member reduces the amount of energy consuming material with respect to the flighting sliding action.

A plurality of knife or blade members 25 are replaceably secured to the outer peripheral edge portions of the central and upper flighting portions, with the knife or blade members extending radially outwardly therefrom, as shown in FIGS. 1–3. The lower flighting portion 20, the central flighting portion 22 and the upper flighting portion 24 are spirally wound about a central auger cylinder 27. Generally, approximately four knife members are secured to the lower flighting member 20, three knife members are secured to central flighting 22 and three knife members to the upper flighting portion 24. The auger flighting portion 18 is driven by conventional power means, as is well known in the art. An outlet 28 is provided adjacent one lower end of the container tub 12 to permit removal of the processed and mixed materials from the mixer 10, as is known in the art.

As illustrated in FIGS. 1–2, the knife blades 25 are replaceably secured by bolts 25a to the outer edge surfaces of the central and upper flighting portions and extend radially outwardly therefrom. The knife blades 25 engage the baled or fibrous material that is deposited into the upper open end of the container tub of the mixer to shred and cut the fibrous material.

As shown in FIG. 3, the knife blades 25 are secured adjacent the ends of the line or trailing edge 21b. The extension of the knife blades on the trailing edge and outer edge of the lower flighting portion permits the knife blades to engage the material on the floor 17 of the mixer to facilitate cutting and mixing. Preferably, as shown in FIGS. 2 and 3, the lower flighting portion 20 includes four knife blades, and the upper trailing end portion 24a of the upper flighting portion 24 includes a further knife blade. The remaining five knife blades may, preferably, be mounted to the upper and central flighting portions. However, it is not desirable to position a knife blade 35 on the central flighting portion directly above the leading cutting edge 21a because of the interference with the leading cutting edge 21a and the sweeping action of the lifting the cut material over the leading edge. Additionally, the knife blades are positioned on the lower flighting portion 20 to extend outwardly to cut and engage the material on the floor of the mixer to facilitate cutting and mixing of the material.

Figure 4:
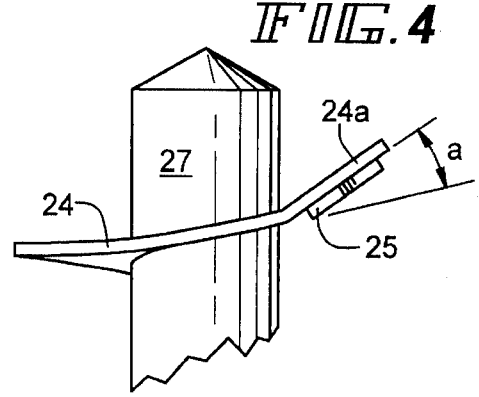
FIG. 4 is a cross-sectional view of the mounting of the knife members to the upper trailing end portion or the upper flighting portion.

As shown in FIG. 4, the upper trailing end portion 24a of the spirally wound upper flighting portion 24 includes a knife or blade member 25 attached to the upper end portion and extending radially outwardly therefrom. The upper trailing end portion 24a of the auger flighting portion is illustrated as being bent upwardly from the plane of the flighting between an angle "a" of 15 to 25 degrees. In such a position, the knife blade 25 is structurally arranged to extend upwardly from the edge of the bent flighting at a predetermined angle to engage the baled or fibrous material to cut and shred the material to facilitate mixing. It has been found that by positioning the upper blade at an angle on the bent flighting permits the rapid opening and tearing apart of the deposited baled or fibrous material to break the same into small cut pieces and to facilitate mixing within the mixer. When the angle of the knife blade extending from the bent flighting is greater than approximately 25 degrees, the knife blade frequently does not cut the material into chunks but instead engages the material and flings the material out of the container tub of the mixer assembly. When the angle of the cutting blade is less than approximately 15 degrees, the knife blade does not properly engage the material to cut the material into suitable cut pieces. It has been determined that a preferred angle of the knife blade 25 of approximately 22 degrees provides the optimum engagement of the knife blade 25 into the bale of material or fibrous material to cut and shred the material to facilitate mixing within the mixer.

Figure 3A:
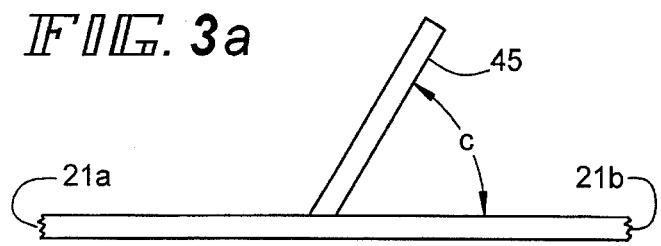
FIG. 3a is a sectional view taken along lines 3a—3a in FIG. 3.
Figure 5:
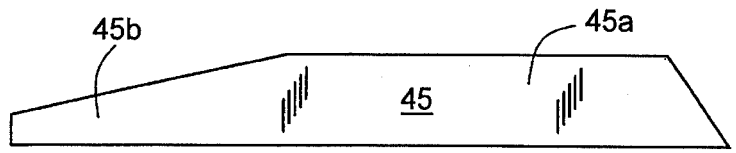
FIG. 5 is a frontal view of the kicker plate in accordance with the present invention.

In accordance with the present invention, it is preferred that the upper surface of the extension member 21 of the lower flighting portion 20 includes a deflector or kicker plate 45 mounted at an angle adjacent to the leading edge 21a to feed the cut material into the auger flighting to facilitate mixing. The kicker plate member 45 is further illustrated in FIG. 5 and is a few inches in length. As illustrated in FIGS. 3 and 3a, the kicker plate 45 is mounted substantially between the leading edge 21a and the trailing edge 21b of the extension member 21 of the lower flighting portion 20 at an angle "b" of between about 25 to 45 degrees with respect to the leading edge 21a. It has been found that an angle of approximately 35 degrees provides the optimum deflection of the cut material into the auger flighting to facilitate mixing. Also, as shown in FIG. 3a, the kicker plate 45 is raised at an angle "C" with respect to the surface of the wing extension member 21 to provide the deflection of the cut material into the auger flighting. In FIG. 5, the preferred configuration of the kicker plate is substantially a quadrangular planar shape. The kicker plate 45 includes a deflection portion 45a and a funneling portion 45b which deflects and directs the cut material towards the center of the auger flighting for enhanced mixing action. However, it is within the scope of the present invention that the kicker plate may be substantially rectangular in shape to deflect and direct the cut material into the center of the auger flighting.

The complex tapered profile of the auger flighting member is important to assure material lift and recirculation with minimum power consumption. Additionally, the extended portion of the lower most auger flighting portion enables the complete lower floor to be sweeped to assure all material is recirculated and also to assure complete clean out when unloading.

Also, the recirculation kicker plate 45, welded to the extension member of the lower auger flighting, is very important to assure the material picked up by the lower flighting is moved toward the auger center to be lifted and recirculated for mixing. Without this benefit, much of the material would simply slide over the narrow extension member to be picked up again on the next pass or revolution.

The cut-off portion of the lower flighting reduces the amount of energy consuming material-to-flight sliding action. The use of the recirculation fin enables this cut-off portion because the bulk of the feed material in the cut-off flight area has already been moved toward the flighting nearer the auger center. Also, the bent end of the upper flighting portion at the upper end of the auger, where material exits, gives the fibrous material extra lift during its vertical movement prior to its entering the elliptical recirculation path, as shown by the arrows 48 in FIG. 1. This enables the use of a shorter auger thereby reducing energy consumption and side loading on the auger support bearings.

Finally, the outward slope of the sidewalls of the mixer tank, as illustrated in FIGS. 1 and 3, is important to the recirculation pattern of the material. The elliptical configuration facilitates control of the rotation of material within the tank. Thus, the interaction between the flighting profile and the tank slope facilitates cutting and mixing within the mixer.

Finally, by way of example to illustrate the dimensional tapered relationship between the lower, central and upper flighting portions, the diameter of a circular floor of a mixer having outwardly sloped sidewalls is approximately 80 inches. The central auger cylinder 27 has a diameter of approximately 18 inches and the extension member 21 of the lower flighting portion has a radius of approximately 30½ inches from the central auger cylinder 27 to its outer edge. The remaining portion of the lower flighting member 20 has a radius of approximately 20 inches from the auger cylinder 27 to its outer edge. After between about three quarters to one full turn of the lower flighting portion, the central auger flighting structure commences. The central auger flighting structure 22 extends for approximately one turn and has a radius of approximately 12¼ inches from the auger cylinder to its outer edge. Finally, the upper flighting portion commences and extends for approximately one turn and has a radius of approximately 10½ inches from the auger cylinder to its outer edge.

It is specifically within the scope of the present invention that the auger flighting structure may include only a lower auger flighting portion and a continuous upper auger flighting portion. Preferably, in such a structure, the trailing edge portion of the upper flighting portion is bent upwardly between about 15 to 25 degrees from the plane of the auger flighting member, as has been previously disclosed. Also, in such a structure, the radius of the lower flighting member is greater than the radius of the upper flighting member.

I claim:

1. A mixer for mixing fibrous material comprising:

a container tub having a floor;

a rotating auger flighting member positioned uprightly within said container tub and comprised of an auger cylinder member having at least a lower flighting portion and an upper flighting portion, with each of said flighting portions being continuous with respect to one another and spirally wound about said auger cylinder member to lift the cut material upwardly from said floor to facilitate mixing, with said lower flighting portion comprised of an extension member having a leading edge cooperating with the floor of said tub to remove the cut material from said floor and to feed the cut material into said auger flighting member to facilitate continuous mixing within the mixer, and an outer peripheral edge cooperating with the floor of said tub to facilitate mixing of material, with the radial width of said extension member being at least equal to the remainder of said lower flighting portion and with the radial width of said lower flighting portion being greater than the radial width of said upper flighting portion; and a plurality of knife members secured to said auger flighting member and extending outwardly therefrom.

2. The mixer in accordance with claim 1, wherein said floor of said container tub is substantially circular in configuration.

3. The mixer in accordance with claim 2, wherein said container tub includes a first end, a second end and sidewalls extending between said first and second ends, with said container tub sidewalls sloped outwardly from the floor of said tub.

4. The mixer in accordance with claim 1, wherein said extension member of said lower flighting portion substantially covers the floor of said container tub during each revolution of rotation of said auger flighting member.

5. The mixer in accordance with claim 1, wherein said radial width of said extension member of said lower flighting portion at said leading edge is greater than the radial width of the remainder of said lower flighting member.

6. A mixer for mixing fibrous material comprising:

a container tub having a floor;

a rotating auger flighting member positioned uprightly within said container tub and comprised of an auger cylinder member having a lower flighting portion, a central flighting portion and an upper flighting portion, with each of said flighting portions being continuous with respect to one another and spirally wound about said auger cylinder member to lift the cut material upwardly from said floor to facilitate mixing, with said lower flighting portion comprised of an extension member having a leading edge cooperating with the floor of said tub to facilitate continuous mixing within the mixer and wherein the radial width of said extension member is greater than the radial width of the remainder of said lower flighting portion, and wherein the radial width of said central flighting portion is less than the radial width of the remainder of said lower flighting portion and is greater than said radial width of said upper flighting portion; and a plurality of knife members secured to said auger flighting member and extending outwardly therefrom.

7. The mixer in accordance with claim 6, wherein said container tub is substantially circular in configuration.

8. The mixer in accordance with claim 7, wherein said container tub includes a first end, a second end and sidewalls extending between said first and second ends, with said container tub sidewalls sloped outwardly from the floor of said tub.

9. The mixer in accordance with claim 6, wherein said extension member of said lower flighting portion substantially covers the floor of said container tab during each revolution of rotation of said auger flighting member.

10. The mixer in accordance with claim 6, wherein said radial width of said lower flighting portion at said leading edge is structurally arranged to cooperate with the edge of the floor of the tub to facilitate mixing of the material in the mixer.

11. The mixer in accordance with claim 6, wherein said radial width of said extension member of said lower flighting portion at said leading edge is greater than the radial width of the remainder of said lower flighting member.

12. A mixer for mixing fibrous material comprising:

a container tub having a floor;

a rotating auger flighting member positioned uprightly within said container tub and comprised of an auger cylinder member having at least a lower flighting portion and an upper flighting portion, with each of said flighting portions being continuous with respect to one another and spirally wound about said auger cylinder member with said lower flighting portion comprised of an extension member having a leading edge and an outer peripheral edge cooperating with the floor of said tub to facilitate mixing, with the radial width of said extension member being at least equal to the remainder of said lower flighting portion and with the radial width of said lower flighting portion being greater than the radial width of said upper flighting portion;

a plurality of knife members secured to said auger flighting member and extending outwardly therefrom; and a kicker plate mounted on said extension member of said lower flighting portion adjacent the outer end thereof to feed the cut material into said auger flighting member to facilitate mixing.

13. The mixer in accordance with claim 12, wherein said kicker plate is mounted at an angle of about 22 degrees with respect to said leading edge of said lower flighting portion.

14. A mixer for mixing fibrous material comprising:

a container tub having a floor;

a rotating auger flighting member positioned uprightly within said container tub and comprised of an auger cylinder member having at least a lower flighting portion and an upper flighting portion, with said trailing end portion of said upper auger flighting member being bent upwardly between about 15 to 25 degrees from the plane of the auger flighting member with each of said flighting portions being continuous with respect to one another and spirally wound about said auger cylinder member, with said lower flighting portion comprised of an extension member having a leading edge cooperating with the floor of said tub to facilitate mixing of material, and an outer peripheral edge cooperating with the floor of said tub to facilitate mixing of material, with the radial width of said extension member being at least equal to the remainder of said lower flighting portion and with the radial width of said lower flighting portion being greater than the radial width of said upper flighting portion; and a plurality of knife members secured to said auger flighting member and extending outwardly therefrom with said upper flighting portion including a trailing edge portion with a top knife member being attached and secured to the trailing end portion of the auger screw flighting member and extending radially outwardly therefrom.

15. The mixer in accordance with claim 14, wherein said trailing end portion of the upper auger flighting member is bent upwardly at about 22 degrees from the plane of the auger flighting member.

16. A mixer for mixing fibrous of material comprising:

a container tub having a floor;

a rotating auger flighting member positioned uprightly within said container tub and comprised of an auger cylinder member having a lower flighting portion, a central flighting portion and an upper flighting portion, with each of said flighting portions being continuous with respect to one another and spirally wound about said auger cylinder member, with said lower flighting portion comprised of an extension member having a leading edge cooperating with the floor of said tub to facilitate mixing and with the radial width of said extension member being at least equal to the remainder of said lower flighting portion, and wherein the radial width of said central flighting portion is less than the radial width of the remainder of said lower flighting portion and is greater than said radial width of said upper flighting portion;

a plurality of knife members secured to said auger flighting member and extending outwardly therefrom; and a kicker plate mounted on said extension member of said lower flighting portion adjacent said leading edge thereof to feed the cut material into said auger flighting member to facilitate mixing.

17. The mixer in accordance with claim 16, wherein said kicker plate is mounted at an angle of about 22 degrees with respect to said leading edge of said lower flighting portion.

18. A mixer for mixing fibrous material comprising:

a container tub having a floor;

a rotating auger flighting member positioned uprightly within said container tub and comprised of an auger cylinder member having a lower flighting portion, a central flighting portion and an upper flighting portion, with said upper flighting portion includes a trailing edge portion with said top knife member being attached and secured to the trailing end portion of the auger screw flighting member and extending radially outwardly therefrom, with said trailing end portion of the auger flighting member being bent upwardly between about 15 to 25 degrees from the plane of the auger flighting member with each of said flighting portions being continuous with respect to one another and spirally wound about said auger cylinder member, with said lower flighting portion comprised of an extension member having a leading edge cooperating with the floor of said tub to facilitate mixing and with the radial width of said extension member being at least equal to the remainder of said lower flighting portion, and wherein the radial width of said central flighting portion is less than the radial width of the remainder of said lower flighting portion and is greater than said radial width of said upper flighting portion; and a plurality of knife members secured to said auger flighting member and extending outwardly therefrom.

19. The mixer in accordance with claim 18, wherein said trailing end portion of the upper auger flighting member is bent upwardly at about 22 degrees from the plane of the auger flighting member.

* * * * *

UNITED STATES PATENT AND TRADEMARK OFFICE
CERTIFICATE OF CORRECTION

PATENT NO. : 5,615,839
DATED : April 1, 1997
INVENTOR(S) : Gert Hartwig

It is certified that error appears in the above-indentified patent and that said Letters Patent is hereby corrected as shown below:

Claim 9, Column 8, line 26, delete "tab" insert -- tub --;

Signed and Sealed this

First Day of July, 1997

Attest:

BRUCE LEHMAN

*Attesting Officer*    Commissioner of Patents and Trademarks